Dec. 30, 1958     R. R. RICHART     2,866,567
LOADING CONVEYOR AND CAR LOADING SYSTEM
Filed Nov. 30, 1955     2 Sheets-Sheet 1
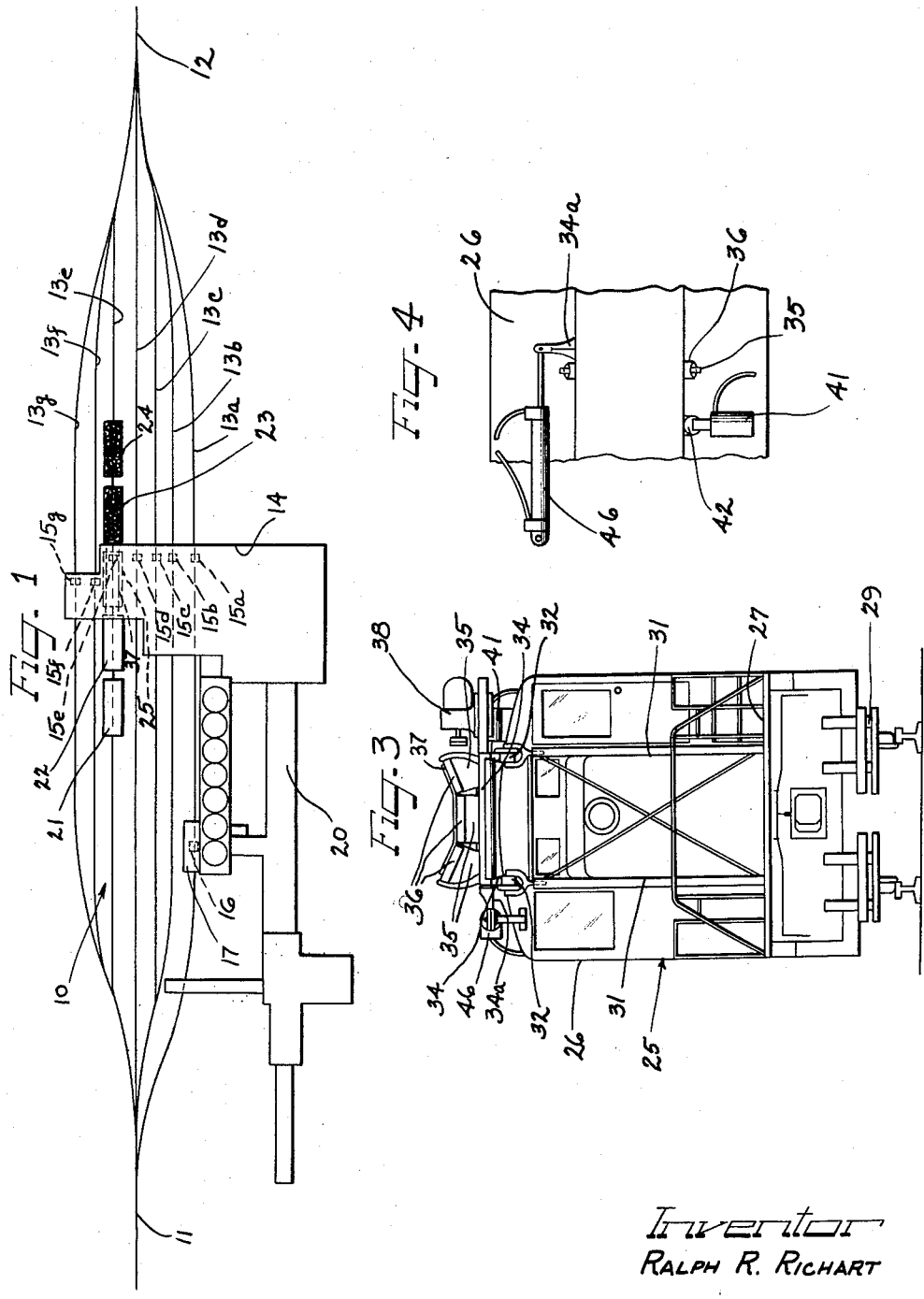
Inventor
RALPH R. RICHART

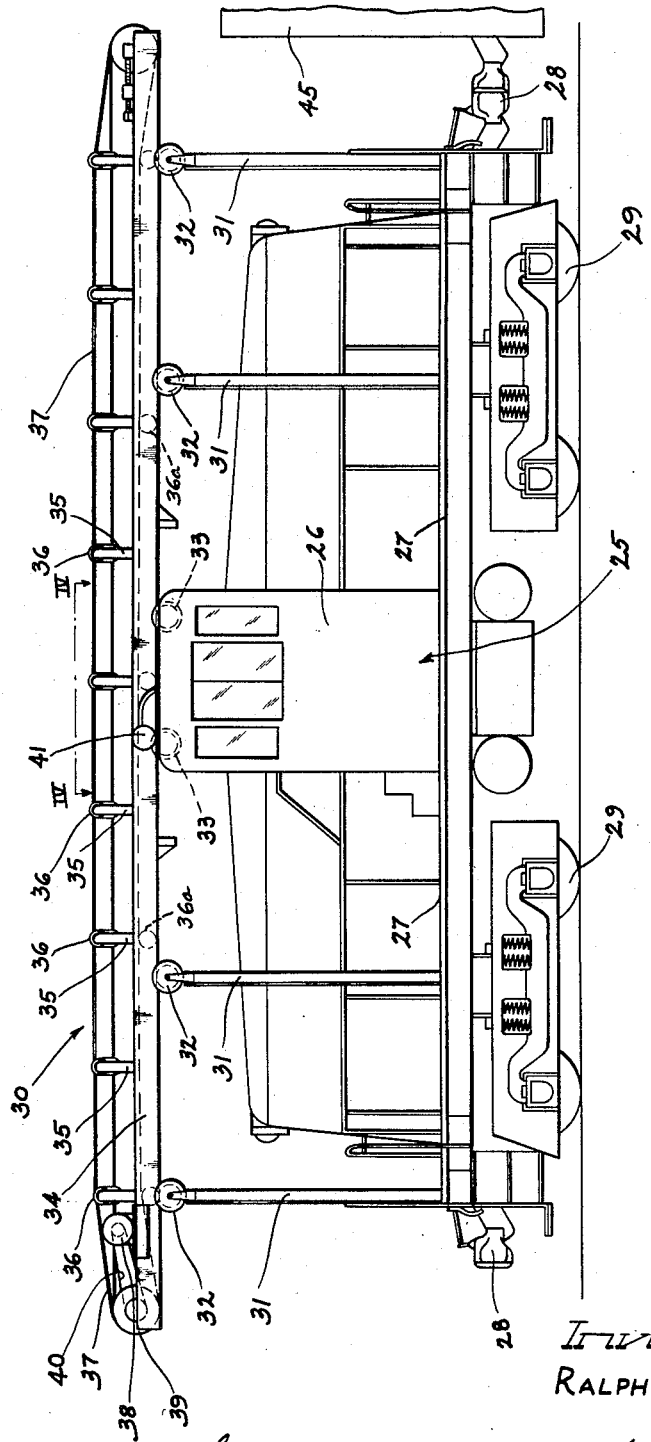

United States Patent Office 2,866,567
Patented Dec. 30, 1958

2,866,567

LOADING CONVEYOR AND CAR LOADING SYSTEM

Ralph R. Richart, Benton, Ill.

Application November 30, 1955, Serial No. 550,062

4 Claims. (Cl. 214—42)

The present invention relates to apparatus for continuously loading a plurality of open top railroad cars or the like and is, more particularly, concerned with the provision of a novel apparatus and method for loading railroad freight cars of the open top type continuously without need for interruption of the loading operation to change freight cars or provide other switching.

As those familiar with the art of loading coal cars or the like in railroad yards or other similar delivery points are aware, the problem of loading railroad freight cars has been a major one. It is, of course, recognized that once a string of open top cars is positioned under the loading chute some elaborate equipment is available which is capable of loading the string in a continuous manner from the overhead loading chute and embodying means for avoiding spillage between cars as succeeding cars are passed out from under the loading chute.

In spite of this somewhat continuous operation, it has been necessary to employ yard men for shifting the freight cars back and forth in the yard to permit their switching and passage under the loading chute. Additionally, it has been necessary to shut down the loading operation as cars are brought up to the loading chute area in strings containing a plurality of empty freight cars, during the period of time when the new string of empties is being placed under the loading chute and the filled freight cars are removed from under the chute and taken to other parts of the yard for subsequent shipment to distant places.

By means of the present invention continuous loading on several tracks simultaneously is provided. With it, a supply of empty coal cars or the like can be switched to a given loading chute and the loaded cars switched out without having to stop the loading operation at any time.

In accordance with the principles of the present invention a novel conveyor system and switch engine combination is provided in which conveyor means are attached to a reversible switch engine. The conveyor operates continuously to move material dropped upon it to one end thereof for loading into the substantially full car being moved from under the chute or the as yet unfilled car being pulled under the chute. As a result of this arrangement material may be continuously fed from the material loading chute even though the switch engine is engaged in moving a string of loaded cars away from the loading area and is bringing a new car or string of cars into position under the loading chute. After the new string of freight cars is positioned under the loading chute the switch engine may be disconnected from them and used to move the loaded cars to their interim, yard, destination after which service the switch engine may be returned for progressive movement of the string of unloaded cars under the loading chute. It is, however, preferred that any of the mechanisms known in the art for moving a string of unloaded cars under a loading chute be utilized so that the switch engine may be employed in arranging additional strings of cars on the same or other loading tracks during the period in which each string of empty cars is being loaded. By this method of operation it has been found possible to maintain a substantially continuous loading operation for a long period with a minimum of man power. As will be apparent to those familiar with industrial rail loading operations the provision of continuous loading makes possible the reduction in the man power force of the yard since all of the switching operations may be accompanied by an ordinary two man switch engine crew and control of the loading may be accompanied by a single person who is required only to control the weights of material being loaded into individual cars, keep the switch engine operators apprised of the condition of the cars being loaded so that additional cars may be switched into place at the proper time, and initiate the loading operation by opening the loading chute, and terminate the loading operation by closing the loading chute after the last of the cars to be loaded has been passed under the loading chute. By providing continuous loading the time heretofore lost in switching cars back and forth under the loading chute is put to use with the result that substantially more cars may be loaded in a given period of time by means of utilization of the present invention than could be loaded under the systems heretofore known and many man hours are saved.

In further accordance with the principles of the present invention the switch engine-conveyor is constructed to permit manipulation of the entire conveyor structure longitudinally of the switch engine to permit utilization of the switch engine with closed box cars or any other conventional freight moving equipment which normally extends above the height of the switch engine and would interfere with the conveyor if it were impossible to manipulate the conveyor. As a result, a switch engine-conveyor combination is provided in which continuous loading of thhe ordinarily low sided open top freight cars may be continuously loaded without eliminating or even reducing the utility of the switch engine for purposes of conventional switching tasks.

It is, accordingly, an object of the present invention to provide a new and novel apparatus for providing continuous loading of a plurality of strings of freight cars of the type loading from above.

Still another object of the present invention is to provide a novel method of loading a plurality of freight cars from overhead.

Still another object of the present invention is to provide a novel combination switch engine and loading conveyor capable of providing continuous loading with simultaneous switching operation beneath a continuously operating overhead loading chute.

A feature of the invention resides in the provision of a conveyor longitudinally extending along the top surface of a switch engine and extending beyond the ends thereof a distance somewhat in excess of the extension of the conventional switch engine coupling members.

Another feature of the invention resides in the provision of a conveyor longitudinally of a switch engine and constructed for movement bodily along the longitudinal axis of the switch engine to permit utilization of the switch engine with freight cars or the like having couplings bringing part of the superstructure thereof within reach of the ends of the conveyor when the conveyor is in its central or neutral position.

Still a further object of the present invention is to provide a novel method of loading freight cars or the like.

Still another object of the present invention is to provide an improved switch engine capable of accomplishing all of the functions ordinarily performed by switch engines and further capable of switching operations in and around material loading chutes such that loading operations may continue at substantially all times independently of the switching of the freight cars participating in the loading operation.

Still further objects and features of the present invention will at once become apparent to those skilled in the art from a consideration of the attached drawings wherein one preferred form of the invention is shown by way of illustration only, and wherein:

Figure 1 is a schematic layout of a rail loading station providing overhead loading facilities and a plurality of feeder or storage sidings;

Figure 2 is a side elevational view of the combined switch engine and conveyor of the present invention;

Figure 3 is an end elevational view of the structure shown in Figure 2 and viewed from the left in that figure; and Figure 4 is a partial plan view of the conveyor positioning mechanism and taken along the line IV—IV of Figure 2.

As shown on the drawings:

As may be seen from a consideration of Figure 1 of the drawings, the apparatus and method of the present invention are intended for use in connection with a conventional railroad coal car loading yard of the multi-track type provided with a plurality of overhead loading chutes. The yard, generally indicated at 10, is provided with inlet and egress tracks 11 and 12 which supply a plurality of loading tracks 13a, 13b, 13c, 13d, 13e, 13f and 13g. The loading tracks pass under a loading dock 14 having respective loading chutes 15a, 15b, 15c, 15d, 15e, 15f and 15g. Further loading chutes may, of course, be provided and in the figure shown an additional loading chute 16 is provided at an additional overhead loading dock 17 associated with storage facilities at the left hand end of the general plant 20. It will, of course, be understood that the yard facilities and the overhead loading structures shown in Figure 1 are considered conventional and form no part of the present invention. Further, it will be understood that the facilities may be varied through a wide range without in any way affecting the application or utility of the present invention to the loading operations carried on in the yard.

As illustrated in Figure 1, a plurality of open top freight cars 21, 22, 23 and 24 are positioned on the loading track 13e. As illustrated, the cars 23 and 24 are filled with material loaded therein from the overhead chute 15e, while the cars 21 and 22 are empty. A switch engine 25, shown in dotted lines in Figure 1, is coupled to the cars 22 and 23 and as there shown is in the act of moving the loaded cars 23 and 24 from the loading area and at the same time pulling the empty cars 21 and 22 under the loading chute 15e. As will be more fully set forth below, this operation is accomplished without discontinuing or in any way interrupting the flow of material from the loading chute 15e and requires no manual manipulation of empty or loaded cars at any point in the loading yard.

As illustrated in Figures 2, 3 and 4, continuous loading is achieved in accordance with the principles of the present invention through the modification of a conventional reversible diesel switch engine generally indicated at 25. Such switch engine may, of course, comprise substantially any of the well known makes and as here shown takes a well known conventional form having a centrally located operator's cab 26, a walk around platform 27, couplers 28 and driving trucks 29. To this conventional structure a conveyor generally indicated at 30 is added. The conveyor 30 is, as may be clearly seen from Figure 2, mounted on a plurality of rigid support braces 31 carrying rollers 32 at the upper ends thereof. Additional rollers 33 are provided in the upper surface of the cab 26 and, as will be seen, all of the rollers 32 and 33 operate to support the frame 34 of the conveyor 30 for rolling movement back and forth longitudinally of the switch engine 25.

The conveyor 30 includes a plurality of belt supports 35 carrying rollers 36 forming a trough-like support for the continuous belt 37. The belt 37 may be caused to move in any manner but in the embodiment shown a small motor 38 drives the end conveyor belt pulley 39 by means of a belt 40. The motor 38 is of any conventional reversible type to permit movement of the belt 37 in either direction fore and aft of the engine 25. Return idlers or rollers 36a, carried in the frame 34, support the belt 37 on the return side.

The conveyor 30 is ordinarily positioned centrally of the engine 25 by means of a locking detent 41 which cooperates with a latch 42 secured to the frame 34 of the conveyor. However, since the entire conveyor 30 projects, when in its central position, beyond the couplings 28 of the engine 25 it may be found that the ends of the conveyor will occasionally interfere with box cars or other transport vehicles extending above the upper level of the usual open top freight car shown at 45. In order to prevent interference of the conveyor with such vehicles and in order to permit the use of the switch engine 25 with any and all types of transport vehicles, a reciprocating fluid motor 46, which is secured to the cab 26 of the switch engine is adapted to reciprocate the frame 34 of the conveyor through a bracket 34a. It is preferred that the motor 46 be capable of reciprocating the conveyor frame 34 in either direction a distance of approximately two feet thereby assuring movement of the conveyor to a point well away from any car which might be coupled to a respective coupling 28. Of course, when it is desired that the conveyor frame 34 be moved relative to the engine 25, the locking detent 41 is actuated to release the frame prior to application of a frame moving force by the motor 46. While it is, of course, satisfactory to provide two separate valve controls for the detent 41 and the motor 46, these valves may be incorporated into a single sequentially operating valve which automatically opens the detent 41 prior to actuation of the motor 46 in either direction. While the detent 41 and the motor 46 have herein been illustrated as hydraulically actuated it will be apparent that actuation for these elements may be provided in any suitable manner, either manual or power.

With the structure above set forth, the switch engine 25 may be connected to transport vehicles, such as for example an open top coal car, generally indicated at 45 in Figure 2 in the conventional manner by means of couplings 28. With the conveyor 30 in the central position, it will extend slightly over the top of the car 45. If, then, the engine 25 is moved with the car 45 out from under a continuously loading overhead chute, the conveyor belt 37 will move under the chute as the car 45 moves away from it. By continuously running the belt 37 toward the right as viewed in Figure 2, when the engine 25 is moving toward the right, the material dropped from the overhead chute onto the conveyor belt 37 will be conveyed into the car 45 as it moves away from the chute, thereby preventing any spillage of material. It is assumed that in such movement, the engine 25 will pull a second, empty, car or transport vehicle similar to the car 45 into position under the chute as it moves the car 45 away from the chute. Thus, as the empty car is pulled under the chute, the conveyor belt 37 will be moved out from under the chute and material falling from the chute will be deposited in the empty car. At this point, the empty car may be uncoupled in position under the chute and the switch engine 25 may move the full car away to some other point in the loading yard for storage or coupling to an outgoing train. Specifically relating this procedure to the arrangement shown in Figure 1, it is noted that the cars 23 and 24 would be pushed toward the right by the switch engine 25, with the conveyor belt 37 moving material dropping continuously from the chute 15e into the loaded car 23. As soon as the car 22 is positioned under the loading chute 15e, the engine 25 is uncoupled and operates to move the loaded cars 23 and 24. In most modern loading facilities, apparatus is provided for moving the cars, themselves, under the loading chute but it will be apparent that the engine 25 may be used to move the cars back and forth under the chute 15e, for example, in any manner whatever without causing spillage of material as the switch engine passes under the loading chute.

It will be understood that the conveyor belt 37 may be moved in either direction and accordingly material from the loading chute may be directed into either the empty car behind the engine or the already substantially full car in front of the engine, as the full cars are moved out from under the chute.

It will thus be understood that I have developed a novel apparatus and an improved method for loading open top railroad cars or the like, which apparatus and method provide for continuous loading operations even during switching or other movement of the railroad cars. At this point it is noted that while the vehicle 25 has been termed a switch engine and the cars have been generally described as railroad cars, it is to be understood that the vehicle 25 may comprise substantially any type of utility vehicle utilized for moving other vehicles and that the cars to be loaded may comprise substantially any type of open top transport vehicle capable of connection with or movement by the utility vehicle. Accordingly, these generic terms will be utilized in defining the following claims.

Since it is apparent that variations and modifications may be made in the hereinabove described apparatus and method without departing from the scope of the novel concepts of the present invention, it is intended that the scope of the invention be limited solely by the scope of the hereinafter appended claims.

I claim as my invention:

1. In apparatus for continuously loading material from an overhead source into a plurality of open top transport vehicles sequentially positioned under said source, a utility vehicle for moving said transport vehicles beneath said source, means on said utility vehicle for securing said utility vehicle between first and second transport vehicles and conveyor means extending longitudinally of the utility vehicle above the utility vehicle and substantially spanning the space above said utility vehicle between said first and second transport vehicles, means securing said conveyor to said vehicle for movement therewith at all times, and conveyor belt means movable relative to said utility vehicle and associated with said conveyor for moving material dropped onto said utility vehicle whereby the material is moved onto position over and dropped into said first or second transport vehicle.

2. In apparatus for continuously loading material from an overhead source into a plurality of open top transport vehicles sequentially positioned under said source, a utility vehicle for moving said transport vehicles beneath said source, means on said utility vehicle for securing said utility vehicle between first and second transport vehicles and conveyor means extending longitudinally of the utility vehicle above the utility vehicle and substantially spanning the space above said utility vehicle between said first and second transport vehicles, means securing said conveyor to said vehicle for movement therewith at all times, and conveyor belt means movable relative to said utility vehicle and associated with said conveyor for moving material dropped onto said utility vehicle whereby the material is moved into position over and dropped into said first or second transport vehicle, said means securing said conveyor normally holding the conveyor in a centrally located position above said vehicle in which the ends of the conveyor project beyond the ends of the vehicle, said means including detent means for releasing said conveyor to permit longitudinal shifting thereof relative to said utility vehicle to permit coupling said utility vehicle to varying types of transport vehicles without interference by said conveyor.

3. In apparatus for continuously loading material from an overhead source into a plurality of open top transport vehicles sequentially positioned under said source, a utility vehicle for moving said transport vehicles beneath said source, means on the utility vehicle for securing said utility vehicle between first and second transport vehicles and conveyor means secured on said utility vehicle and substantially spanning the space above said utility vehicle between said first and second transport vehicles, means securing said conveyor to said vehicle for movement therewith at all times and conveyor belt means movable relative to said utility vehicle and associated with said conveyor for moving material dropped onto said utility vehicle whereby the material is moved into position over and dropped into said first or second transport vehicle, and means normally securing said conveyor to a centrally located position above said vehicle in which the ends of the conveyor project beyond the ends of the vehicle, said means including detent means for releasing said conveyor to permit longitudinal shifting thereof relative to said utility vehicle to permit coupling said utility vehicle to varying types of transport vehicles without interference by said conveyor.

4. In apparatus for continuously loading material from an overhead source into a plurality of open top transport vehicles sequentially positioned under said source, a utility vehicle for moving said transport vehicles beneath said source, means on said utility vehicle for securing said utility vehicle between first and second transport vehicles and conveyor means secured on said utility vehicle and substantially spanning the space above said utility vehicle between said first and second transport vehicles, means securing said conveyor to said vehicle for movement therewith at all times, and conveyor belt means movable relative to said utility vehicle and associated with said conveyor for moving material dropped onto said utility vehicle during movement thereof whereby the material is moved into position over and dropped into said first or second transport vehicle, and means for bodily shifting said conveyor longitudinally of the utility vehicle, said means comprising a hydraulic jack connected to the frame of said conveyor and to said utility vehicle and a locking detent for maintaining said conveyor in its shifted or original position relative to said utility vehicle.

References Cited in the file of this patent

UNITED STATES PATENTS

| | | |
|---|---|---|
| 1,461,707 | Hanson et al. | July 10, 1923 |
| 1,512,844 | Groshek | Oct. 21, 1924 |
| 1,524,291 | Dennis | Jan. 27, 1925 |
| 1,563,387 | MacEachen | Dec. 1, 1925 |
| 1,785,593 | Paisley | Dec. 16, 1930 |
| 2,384,385 | Madeira | Sept. 4, 1945 |
| 2,659,498 | McCarthy | Nov. 17, 1953 |
| 2,724,515 | Scheuchzer et al. | Nov. 22, 1955 |